Sept. 15, 1953     B. H. LANTZ     2,652,092
TIRE TRACTION CLAMP

Filed Jan. 5, 1950     2 Sheets-Sheet 1

Inventor
Brice H. Lantz
By: Spencer, Johnston, Cook + Root
Attys

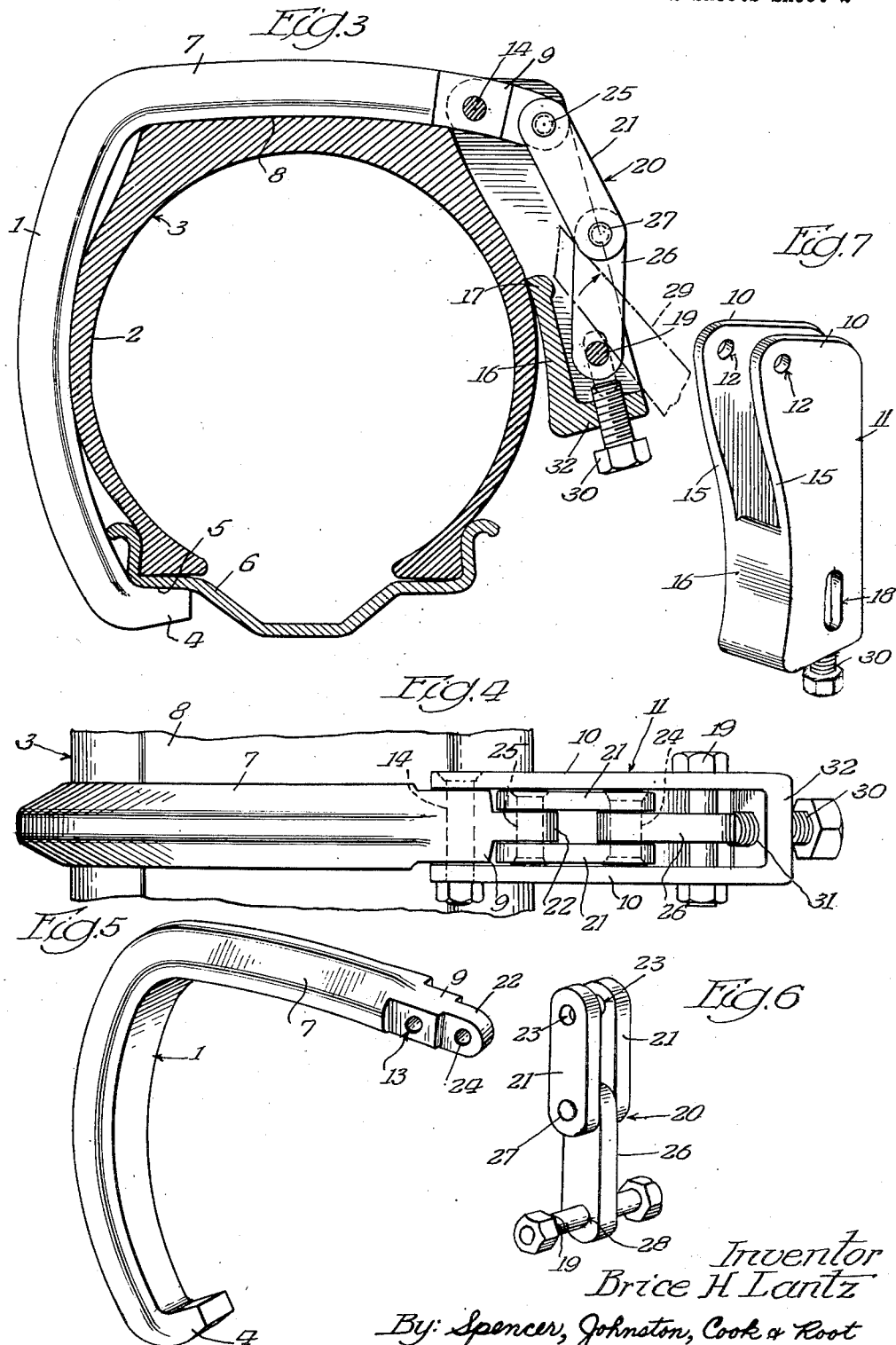

Patented Sept. 15, 1953

2,652,092

UNITED STATES PATENT OFFICE 2,652,092

TIRE TRACTION CLAMP

Brice H. Lantz, Valparaiso, Ind., assignor to Lantz Manufacturing Company, Inc., Valparaiso, Ind., a corporation of Indiana Application January 5, 1950, Serial No. 136,903

4 Claims. (Cl. 152—228)

This invention relates to a tire traction clamp for application to the tire of a vehicle such as an automobile or truck, so that traction may be had for the tire of a wheel when the wheel is imbedded in mud or when the vehicle is being used over ice and snow.

The primary object of the present invention consists in the provision of a new and novel form of improved tire traction clamp which is provided with a rim engaging lip adapted to fit on the under side of the rim on the inside of the wheel and having a clamping action against the opposite side wall of the tire, whereby the device may be easily applied in position and securely clamped to the tire to prevent the device from being thrown off when the wheel spins and particularly when the tire is wet, and whereby the device may be quickly and easily removed from the tire.

Another important object of the invention is the provision of a traction device having clamping means incorporated therewith to cause the device to be clamped securely to the tire, there being a plurality of links pivotally interconnected so as to effect a locking operation of the links when the pivotal connection between the links is on one side of the line between their attaching ends and to permit easy removal of the clamp or device from the tire when the said pivotal connection between the links is moved to the other side of the said line.

A further object of the invention resides in the provision of a device adapted to be applied to the tire of a vehicle wheel so that traction may be maintained on ice, snow or muddy places, there being an arm extending on one side of the tire and terminating in a lip which engages the underside of the wheel rim of one side thereof, there being also a clamping arm which has an adjusting element to permit the device to be applied to tires of varying sizes and diameters.

Numerous other objects and advantages will be apparent throughout the specification which follows.

The accompanying drawings illustrate a certain selected embodiment of the invention and the views therein are as follows:

Fig. 3 is a view similar to Figs. 1 and 2 and showing the manner in which the device is removed from the tire;

Fig. 4 is a detailed view looking in the direction of the arrows 4—4 of Fig. 1;

Fig. 5 is a perspective view of a part of the device, this part comprising one side arm and the traction bar;

Fig. 6 is a detailed perspective view showing certain linkage mechanism for effecting the clamping operation of the device of the invention; and Fig. 7 is a detailed perspective view of the clamp arm or housing of the device, the said clamp arm being pivotally attached at one end to the member shown in Fig. 5 and pivotally supporting the structure disclosed in Fig. 6.

Figure 1:
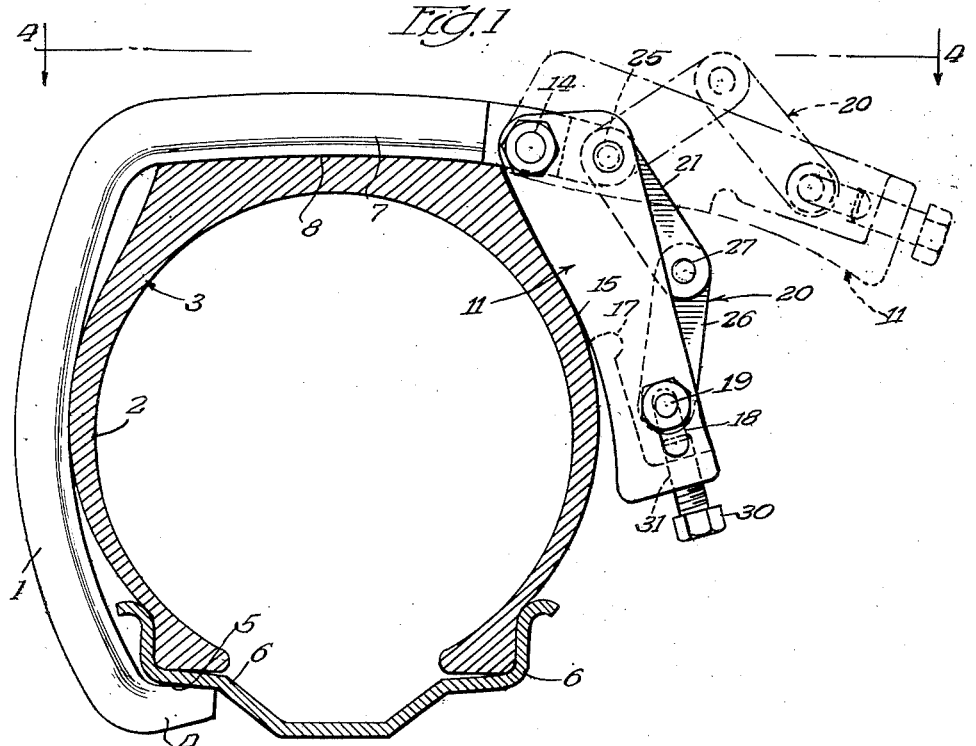
Fig. 1 is a detailed sectional view showing the rim and accompanying tire of a vehicle wheel and the manner in which the tire traction device or clamp of the invention is applied.

The particular device herein shown for the purpose of illustrating the invention comprises a curved side bar or arm 1 which is bulged outwardly, as shown in the various figures, so as to accommodate and receive the bulged side wall 2 of a pneumatic vehicle tire 3. The lower or free end of the curved side arm 1 terminates in an inwardly directed lip 4 which is adapted to engage the underside 5 of the rim 6 upon which the tire 3 is mounted.

A traction bar 7 is adapted to extend across the tread 8 of the tire 3 so as to give traction to the wheel when the vehicle is on a wet, icy, or snowy surface or is imbedded in mud. The traction bar 7 is angularly disposed with respect to the arm 1 and is preferably made integral with the said arm 1. The arm 1, its attaching lip 4 and the traction bar 7 are preferably moulded in one piece from suitable material, such as steel. The free end of the bar 7 is reduced in its transverse dimension as indicated at 9, Fig. 5, and extends between the opposed walls 10, 10 of a housing or clamp member 11 of Figure 7. The housing 11 is provided with aligned holes 12, 12 which are in alignment with an opening 13 in the reduced end 9 of the traction pair to receive a pin, stud, or bolt 14, Fig. 4, whereby the housing 11 is pivotally connected to the free end of the traction bar 7.

The inner edges of the opposed side walls 10, 10 of the housing or clamp arm 11 are curved concavely, as indicated by the numerals 15, 15, Fig. 7. Connected between the lower ends of the opposed side walls 10, 10 is an inner wall 16. The inner surface of the wall 16 is flush with the inner edges 15, 15 of the opposed side walls 10, 10, so that the wall 16 and the edges 15, 15 may conform with the curvature of the tire wall. The inner wall 16 preferably extends upwardly to a height which is approximately equal to half of the length of the housing or clamp arm 11. The upper end of the wall 16 is provided with an outwardly projecting ridge or boss 17 which serves as a stop for certain linkage mounted within the housing or clamp arm 11.

The lower end of the housing or clamp arm 11 is provided with elongated slots 18 in its opposite side walls 10 through which a bolt, pin, or rivet 19 passes, the member 19 having limited movement throughout the length of the cooperating slots 18.

Linkage 20 is adapted to be arranged within the hollow housing or clamp arm 11 to effect a tightening or clamping action of the device on the vehicle wheel tire 3. This linkage 20 comprises a pair of spaced links 21, 21 which are arranged on opposite sides of a protruding tongue 22, Figs. 4 and 5, projecting outwardly from the reduced end 9 of the traction bar 7. These links 21, 21 are provided with aligned holes 23 which are in alignment with a hole 24 formed in the tongue 22 of the bar 7. A fastening pin such as a rivet 25 passes through the aligned holes 23 and 24 and pivotally secures the linkage 20 to the projecting tongue 22 on the bar 7. A link 26 is arranged between the two links 21, 21 and is pivotally connected thereto by means of a pin 27, Fig. 6. The lower end of the link 26 is provided with a hole 28 which is in alignment with the opposed slots 18 in the housing or clamp arm 11. The bolt or pin 19 passes through the aligned slots 18 and the hole 28 in the link 26 to pivotally secure the lower end of the linkage 20 to the hollow housing or clamp arm 11.

The linkage 20 permits the device to be arranged in position about the tire 3 by first arranging the arm 1 on the inner side of the tire and in a position so that the lip 4 will underlie the bottom surface 5 of the rim 6 on one side thereof. When the device is arranged in that position, the traction bar 7 will overlie the outer surface or tread 8 of the tire and the parts will be in the position shown in dotted lines in Fig. 1 whereupon the links 21, 21 and the link 26 will be in the angular position shown by dotted lines in Fig. 1. The clamp arm or housing 11 is then swung downwardly and inwardly to the solid line position of Fig. 1. The clamp arm or housing is then clamped in position by first inserting a tool 29 in the space between the links 21, 21 and then pressing downwardly on the tool so as to cause the linkage 20 to be pushed inwardly from the position shown in solid lines in Fig. 1 to the position shown in Fig. 2. When the tool 29 is inserted to effect the clamping operation, its pointed end will fulcrum on the reduced end 9 and a part of the tool will abut against the upper arcuate surface of the link 26 whereupon the downward pressure of the tool engaging the upper arcuate surface of the link 26 will force the clamp arm 11 into clamping engagement as shown in Fig. 2.

Figure 2:
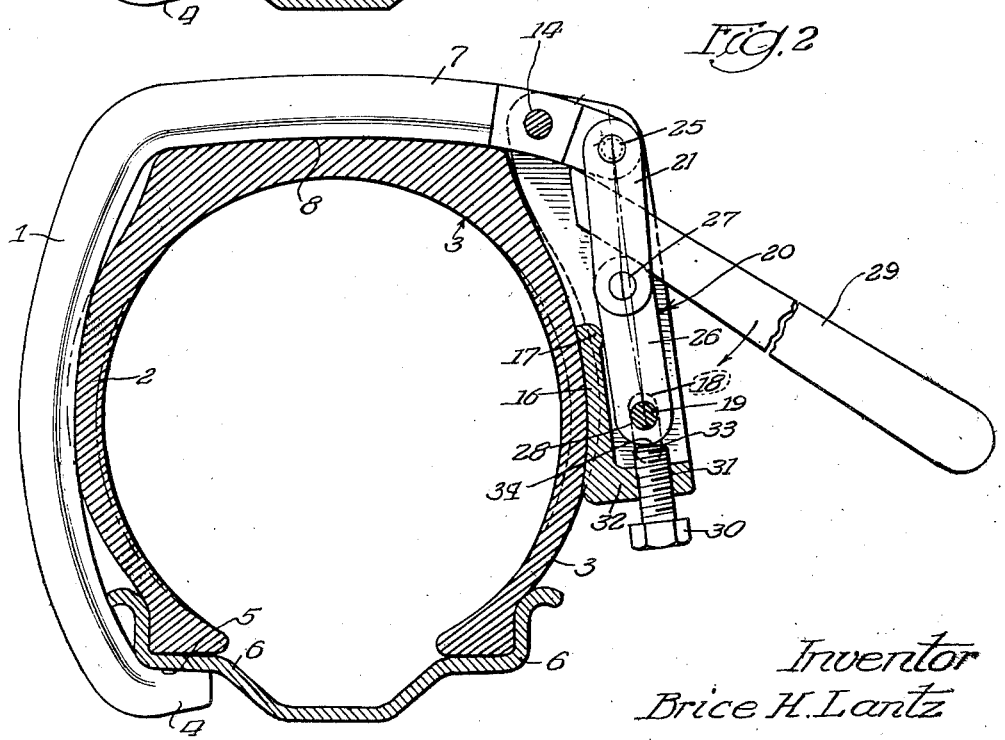
Fig. 2 is a view similar to Fig. 1, and showing the device in its operative clamped position.

In the clamping position shown in Fig. 2 the housing or clamp arm 11 is prevented from swinging or pivoting outwardly by virtue of the linkage 20 being arranged in the position shown in the same figure. In this position, the center of the pin 27 is disposed to the left hand side of the line which passes through the centers of the pins 19 and 25 and the link 26 abuts against the ridge or boss 17. The reaction force exerted by the tire wall upon the housing or clamp arm 11 will maintain the linkage 20 in the position of Fig. 2 until the said linkage is unlocked in the manner hereinafter described.

The device is provided with an adjustment so as to insure definite positive clamping action as well as to make the device adjustable to accommodate tires of different sizes. This adjustment comprises an adjusting bolt 30 which is threadedly received in a threaded bore 31 formed in the under cross bar 32 of the movable clamp arm or housing 11. The upper end 33 of the bolt 30 is adapted to engage the lower curved surface of the link 26 as indicated at 34, Fig. 2. When the adjusting bolt 30 is screwed inwardly, it will shift the pin 19 longitudinally of the aligned slots 18, 18, that is, toward the upper end of the slots, whereupon the clamp arm or housing 11 is caused to move closer toward the arm 1 for better and further clamping, as well as for enabling the device to be applied to tires having relatively small diameters. In order that the device may be applied to tires of large diameters, the adjusting bolt 30 is screwed outwardly whereupon the space between the two arms 1 and 11 will be increased when the device is in clamping position. The amount of adjustment obtained by the operation of the adjusting bolt 30 is limited by the length of the slots 18, 18. After the device is applied in position as shown in Fig. 2, the tool or lever 29 is removed and the adjusting bolt 30 is operated to insure tight clamping operation of the device against the tire. After the adjusting bolt has been operated to effect the proper clamping action, no further adjustment is necessary as the device will be left in its adjusted position to fit that particular tire.

When it is desired to remove the device from the tire, the tool 29 is inserted beneath the lower curved or arcuate ends of either of the links 21 with the pin or bolt 19 acting as a fulcrum for the tool. Thus, downward pressure of the tool will force the linkage 20 to be pulled outwardly to the position shown in Fig. 3, whereupon the housing or clamp arm 11 is free to be shifted to the position shown in dotted lines in Fig. 1 to permit easy removal of the traction device from the wheel.

It has been found in actual practice that there will be a considerable drag or pressure on the device when a vehicle on which it is mounted is stuck on ice, snow, or imbedded in mud. The device, however, will not be thrown off the wheel. It will creep slightly during traction so as to change its position on the wheel. Wear on the tire at one place is thus avoided. The device may creep about the circumference of the tire, but under no conditions will the tire spin within the device, when the device is properly clamped on the tire.

The device is inexpensively constructed, is easy to apply and remove, and definitely and positively remains secured to the tire. This is true regardless of the amount of traction which is applied. The device therefore is a positive means for preventing the tire from spinning when on slippery surfaces and prevents the vehicle from becoming stuck. As soon as the vehicle is out of its entire spinning position and again is in normal traction position, the device is removed. However, if the vehicle is to be run over soft wet ground, the device may be permitted to remain in place, but it is desirable that the device be removed when the vehicle is being moved over solid ground or hard pavement.

Changes may be made in the form, construction and arrangement of parts without departing from the spirit of the invention or sacrificing any of its attendant advantages, and all such changes may be made as fall fairly within the scope of the claims which follow.

The invention is hereby claimed as follows:

1. A tire traction device for a rim mounted tire comprising a rigid arm formed to extend transversely across the inner side wall of the tire, a rigid lip on the arm in position to engage the inner side of the wheel rim on which the tire is mounted, a rigid traction bar integral with the arm and disposed in position to extend transversely across the tread of the tire, a movable arm pivoted to the end of the bar and having a portion forming a shoe for engagement with the outer side wall of the tire, and a pair of toggle links having pivotally interconnected ends and pivot remote ends, said pivot remote ends being respectively pivoted on said bar and on said movable arm, said links being operable, by movement of the pivotally interconnected ends thereof inwardly, to clamp said shoe against the outer side wall of the tire and thereby clamp the tire between said arms to thus secure the device upon a rim mounted tire, and to release the device from mounted position in response to outward movement of the pivotally interconnected ends of the links.

2. A tire traction device comprising a rigid arm formed to extend transversely across the inner side wall of a tire, a rigid lip on the arm in position to engage the inner side of a wheel rim upon which the tire is mounted, a rigid traction bar integral with the arm in position to extend transversely across the tread of a tire, a movable arm pivoted to the end of the bar, said arm having a shoe for engagement with the outer side wall of the tire, clamping means carried by said movable arm to lock said movable arm in rigid position with respect to the bar, with the shoe in frictional engagement with the outer side wall of the tire when the clamping means is arranged in locking position, and screw means co-operating with the clamping means to maintain the movable arm closer to or farther away from the outer side wall, whereby tires of various diameters may be accommodated by said traction device.

3. A traction clamp adapted for application to a tire mounted on the rim of a wheel and comprising a rigid curved inner arm formed to extend transversely across the inner side wall of the tire, a projecting integral lip on the lower end of the inner arm in position to engage the inner side of a wheel rim on which the tire is mounted, a rigid traction bar integral with the inner arm in position to extend transversely across the tread of the tire, an outer arm pivoted to the end of the traction bar and having its inner side curved to form a shoe in position to engage the outer side wall of the tire, and clamping means to clamp the device to the tire and squeeze the tire between said arms, said clamping means comprising a first link having its outer end pivoted to said traction bar, and a second link having its inner end pivoted to the inner end of the first link, the outer end of the second link being pivotally and slidably connected to said outer arm.

4. A traction clamp adapted for application to a tire mounted on the rim of a wheel and comprising a rigid curved inner arm formed to extend transversely across the inner side wall of the tire, a projecting integral lip on the lower end of the inner arm in position to engage the inner side of a wheel rim on which the tire is mounted, a rigid traction bar integral with the inner arm in position to extend transversely across the tread of the tire, an outer arm pivoted to the end of the traction bar and having its inner side curved to form a shoe in position to engage the outer side wall of the tire, and clamping means to clamp the device to the tire and squeeze the tire between said arms, said clamping means comprising a first link having its outer end pivoted to said traction bar, and a second link having its inner end pivoted to the inner end of the first link, the outer end of the second link being pivotally and slidably connected to said outer arm, and an adjusting screw threadedly engaging the outer arm and engaging the outer end of the second link to adjustably limit the slidable movement of the second link.

BRICE H. LANTZ.

References Cited in the file of this patent

UNITED STATES PATENTS

| Number | Name | Date |
|---|---|---|
| 1,574,791 | Clark | Mar. 2, 1926 |
| 1,775,211 | Pearson | Sept. 9, 1930 |
| 1,946,846 | Gebhart | Feb. 13, 1934 |
| 2,447,357 | Mosley | Aug. 17, 1948 |